(12) United States Patent
Fitzpatrick et al.

(10) Patent No.: US 8,732,063 B2
(45) Date of Patent: *May 20, 2014

(54) METHOD AND SYSTEM FOR IDENTIFYING HIGH PROBABILITY TRADE MATCHES

(76) Inventors: Daniel R. Fitzpatrick, Summit, NJ (US); James Worden Toffey, Summit, NJ (US)

(*) Notice: Subject to any disclaimer, the term of this patent is extended or adjusted under 35 U.S.C. 154(b) by 366 days.

This patent is subject to a terminal disclaimer.

(21) Appl. No.: 12/907,667

(22) Filed: Oct. 19, 2010

(65) Prior Publication Data

US 2011/0093380 A1    Apr. 21, 2011

Related U.S. Application Data

(62) Division of application No. 12/134,923, filed on Jun. 6, 2008, now Pat. No. 8,577,780.

(60) Provisional application No. 60/942,387, filed on Jun. 6, 2007.

(51) Int. Cl.
G06Q 40/00  (2012.01)
G06Q 40/04  (2012.01)
G06Q 40/06  (2012.01)

(52) U.S. Cl.
CPC ............... *G06Q 40/00* (2013.01); *G06Q 40/04* (2013.01); *G06Q 40/06* (2013.01)
USPC ............................................. 705/37; 705/35

(58) Field of Classification Search
CPC ........ G06Q 40/00; G06Q 40/04; G06Q 40/06
USPC ....................................................... 705/37, 35
See application file for complete search history.

(56) References Cited

U.S. PATENT DOCUMENTS

| | | | | |
|---|---|---|---|---|
| 5,966,700 | A  * | 10/1999 | Gould et al. ..................... | 705/38 |
| 8,046,290 | B2 * | 10/2011 | Fitzpatrick et al. ............. | 705/37 |
| 2004/0034591 | A1* | 2/2004 | Waelbroeck et al. ........... | 705/37 |
| 2004/0236662 | A1* | 11/2004 | Korhammer et al. ........... | 705/37 |
| 2005/0114254 | A1* | 5/2005 | Condie ........................... | 705/37 |
| 2005/0234807 | A1* | 10/2005 | Toffey ............................. | 705/37 |
| 2006/0080214 | A1* | 4/2006 | Hausman et al. ............... | 705/37 |
| 2007/0022036 | A1* | 1/2007 | Korzinin ......................... | 705/37 |
| 2007/0192227 | A1* | 8/2007 | Fitzpatrick et al. ........... | 705/36 R |

OTHER PUBLICATIONS

FIXCITY: Fixcity launches IOI FIX feed; ioinet, FIX CITY's IOI solution, interfaces with order management systems to streamline the buy-side's search for liquidity. (Feb. 15, 2006). M2 Presswire. Retrieved Dec. 13, 2013.*

* cited by examiner

*Primary Examiner* — Kito R Robinson
(74) *Attorney, Agent, or Firm* — Stroock & Stroock & Lavan LLP

(57) ABSTRACT

Methods and Systems for routing an indication of interest message are provided in which one or more external trade messaging systems are monitored to discover and collect information related to a trading posture of a plurality of trading counterparties. The information related to the trading posture of the plurality of trading counterparties is stored in a database and accessed, upon receipt of an indication of interest message to intelligently route the indication of interest message to at least one of the plurality of trading counterparties based at least in part on the information regarding the trading posture of the plurality of trading counterparties stored in the database.

9 Claims, 14 Drawing Sheets

| Trader Advertisements | | | | | | | |
|---|---|---|---|---|---|---|---|
| Time | Style | Size | Sender | | Exch | Total Vol | Comments |
| 10:14 AM | T | 10,100 | DEALER Z | | | 94,885 | |
| 10:13 AM | T | 10,150 | DEALER Q | | | 94,885 | |
| 10:13 AM | T | 577,800 | DEALER Y | | | 2,114,800 | |
| 10:12 AM | T | 100,000 | DEALER P | | | 1,225,000 | |
| 10:12 AM | SX | 5,000 | * | | N | 102,000 | |
| 10:12 AM | T | 350,000 | * | | | 2,114,800 | |
| 10:11 AM | T | 23,921 | * | | | 60,500 | |
| 10:11 AM | T | 52,000 | * | | N | 240,000 | |
| 10:10 AM | T | 9,000 | * | | | 2,417,000 | |
| 10:10 AM | S | 5,600 | * | | | 60,500 | |
| 10:10 AM | T | 400,000 | * | | TH | 490,000 | |
| 10:10 AM | T | 68,400 | * | | O | 87,100 | |
| 10:10 AM | T | 11,700 | * | | N | 11,700 | |
| 10:10 AM | T | 26,500 | * | | | 183,600 | |
| 10:10 AM | T | 130,000 | * | | N | 2,417,000 | |
| 10:10 AM | T | 30,000 | * | | | 1,996,200 | |
| 10:10 AM | T | 39,000 | * | | | 2,417,000 | |

| FIG. 9A | FIG. 9B |
|---|---|

| Tag | Field | Value |
|---|---|---|
| 1010 | BeginString (8) | FIX.4.2 |
| 1020 | BodyLength (9) | 0171 |
| 1030 | MsgType (35) | 6 (Indication of Interest) |
| 1040 | TargetSubID (57) | L103 + SMRT |
| 1050 | MsgSeqNum (34) | 7413 |
| 1060 | SenderCompID (49) | JPMHQ |
| 1070 | TargetCompID (56) | AUTEXIOI |
| 1080 | SendingTime (52) | 20071011-13:00:53 |
| 1090 | IOIid (23) | 10110135076301 |
| 1100 | IOITransType (28) | R |
| 1110 | IOIRefID (26) | 10110135076300 |

Repeating Tags

Not included in the message

| Tag | Field | Value |
|---|---|---|
| 1120 | Symbol (55) | HLT |
| 1130 | SecurityId (48) | 43848109 |
| 1140 | IdSource (22) | 1 (CUSIP) |
| 1150 | SecurityExchange (207) | N |
| 1160 | Side (54) | 1 (Buy) |
| 1170 | IOIShares (27) | 100000 |
| 1180 | Price (44) | 47.0 |
| 1190 | Currency (15) | USD |
| 1194 | IOINaturalFlag (130) | Y |
| 1198 | CheckSum (10) | 002 |

FIG. 10

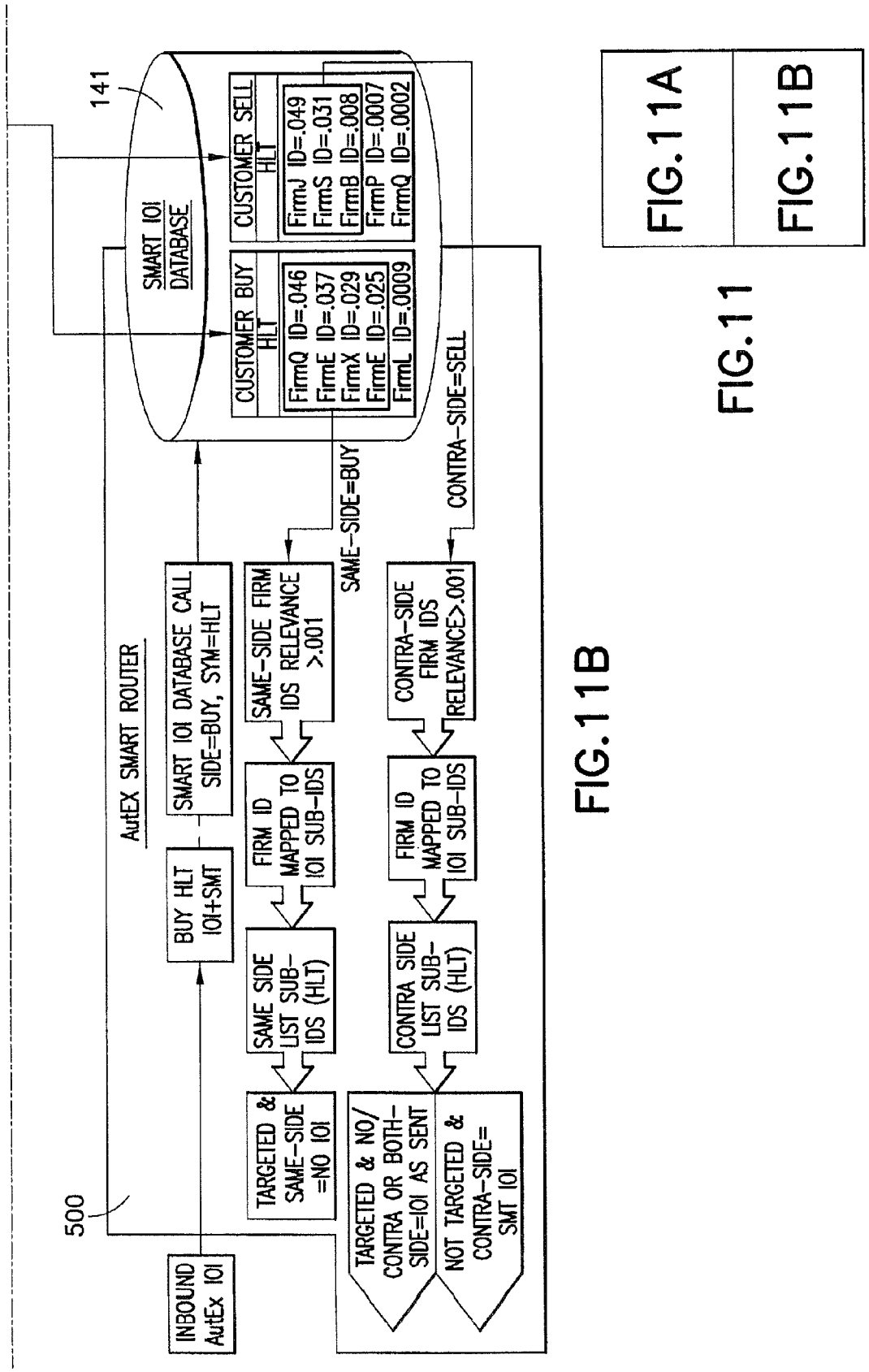

METHOD AND SYSTEM FOR IDENTIFYING HIGH PROBABILITY TRADE MATCHES

CROSS-REFERENCE TO RELATED APPLICATIONS

This application is a divisional application of U.S. patent application Ser. No. 12/134,923, filed Jun. 6, 2008, entitled Method and System For Identifying High Probability Trade Matches, the entire disclosure of which is incorporated herein by reference, which claims priority to U.S. Provisional Patent Application Ser. No. 60/942,387, filed Jun. 6, 2007, entitled Method And System For Identifying High Probability Trade Matches, the entire disclosure of which is incorporated herein by reference. This application also incorporates by reference the entire disclosure of International Patent Application No. PCT/US2006/037857 entitled IOI-Based Block Trading Systems and Methods, published Apr. 12, 2007.

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

FIELD OF THE INVENTION

This present invention relates to methods and systems for routing trade orders and, in particular, to methods and systems that receive indications of interest and advantageously match buyer and sellers based on historical trading activity.

BACKGROUND OF THE INVENTION

In the world of trade in financial instruments, at any given time, there are buyers and sellers of a given type of financial instrument. Changes in the supply and demand of a particular financial instrument (e.g., the number of buy orders as compared to sell orders for the financial instrument) will generally drive the market price of the financial instrument to rise and fall. Thus, knowledge of the trading posture (e.g., whether a particular entity is a buyer or a seller) can be very valuable information as the entity receiving such information tries to predict which way the market may move.

As is known in the art, an entity interested in purchasing (or selling) financial instruments can communicate its interest to other subscribing financial entities using an Indication of Interest ("IOI") message transmitted over a messaging system such as, for example, the Tradeweb Routing Network ("TRN") or Tradeweb's AutEx Network ("AutEx"). The IOI sending entity interested in purchasing or selling financial instruments may be addressing the IOI with incomplete information or no information as to the trading posture of the various IOI targets to which the IOI may be directed. Therefore, if the IOI sender is going to transmit the IOI to a broad range of targets, such targets may include entities that have had no relevant activity with respect to the financial instrument that is the subject of the IOI, same-side activity (i.e., where the IOI is an indication of purchase interest, the target has previously been a buyer), contra-side activity (i.e., where the IOI is an indication of purchase interest, the target has previously been a seller), or has had significant activity in the subject financial instrument as both a seller and buyer. As further described below, a sending entity may direct the IOI to entities that may be willing to provide the contra-side (or part) of the IOI sender's associated transaction. In such a case, the IOI targeting schema has yielded beneficial results for both parties. If, however, the target has had same-side activity, then the IOI sender has revealed potentially valuable information to an entity that is not likely to trade with the IOI sender.

If the IOI reaches a contra-side target, the contra-side target receiving the IOI may then elect to contact and/or transmit a trade order in the financial instrument to the IOI sending entity in hopes of consummating a mutually beneficial transaction. In this case, the IOI target or receiving entity becomes an order sending entity The IOI sending entity then becomes the order target entity and, upon receipt of above referenced trade order in the financial instrument, may then accept and execute the order resulting in the issuance of an execution report to the order sending entity.

A frequent problem occurs when an IOI sender directs an IOI to a second entity that is a same-side target. Such misdirection of an IOI can cause "information leakage," as it indicates the first entity's trading stance to a second entity in the same position as the first entity. Such IOI misdirection may result in the second entity altering its trading behavior, upon receipt of the misdirected IOI, in such a way that the sender of the IOI may be disadvantaged due to a possible adverse movement of the financial instrument's price.

Faced with this problem, users of messaging systems to trade financial instruments classically have had one of two choices to make: (1) direct their IOI messages to a narrow set of entities that are most likely to be on the opposite side of the transaction (e.g., buyers directing IOI messages to possible sellers), to decreasing the risk of "information leakage," but increasing the risk that the IOI-sending user will miss valuable trading opportunities (possible contra-side entities), or, alternatively, (2) direct their IOI messages to a broader set of entities, thereby potentially reducing the number of opportunities are missed, but also increasing the risk of "information leakage."

With reference now to FIG. 3 (prior art) and FIG. 4 (prior art), there is shown an illustration of the technical problem with existing messaging systems for transmitting IOI messages. In FIG. 3 (prior art), there is shown an example of a purchasing user 110 broadly casting an IOI message 210 via messaging system 120. As shown, the purchasing user 110 specifically directs its IOI message 210, via messaging system 120, to broad spectrum of possible selling users 160. As a result, the specifically directed IOI message 212 is received by users 160 that are selling the financial instrument 164, purchasing the financial instrument 168, or disinterested in the financial instrument 166. As described above, whenever IOI message 212 is received by seller user 164, a transaction may be consummated 170. In contrast, when the IOI message 212 is received by a fellow buying user 168, information leakage 174 is likely to occur, and the buying user 168 could take steps that will disadvantage purchasing user 110, which issued the IOI message 210. Finally, if the IOI message 212 is received by a user 166 that is uninterested in entering in any transactions regarding the financial instrument, typically no implications result 172. Thus, in the prior art example of FIG. 3, purchasing user's 110 attempt to reach all potential selling users 160, disadvantageously reached a number purchasing users 160. This is because the user broadly transmitting the IOI will reach all users 160 without regard to the receiving user's trading stance. While this method captures all opportunities, it comes with a high risk of losses due to information leakage.

In the example of FIG. 4 (prior art), there is shown the problems inherent with a purchasing user 110 narrowly casting an IOI message 210 via messaging system 120. As shown, the purchasing user 110 specifically directs its IOI message 210, via messaging system 120, to narrow spectrum of possible selling users 160. As a result, the specifically directed IOI message 212 may be received by users 160 that are selling the financial instrument 164, purchasing the financial instrument 168, or disinterested in the financial instrument 166. Thus, even though the purchasing user 110 attempted to limit information leakage through exposure of the IOI only to a subset of all subscribing users 160, the narrowly cast IOI may still disadvantageously reach some purchasing users. This is because the user transmitting the IOI has very limited information about the actual trading stance of the selected users that will receive its IOI (the information is generally based only on a given IOI target's discourse, i.e. trading or dialogue, with the IOI sending entity). Moreover, in this scenario, while there is a hope of fewer incidents of information leakage, which may or may not be realistic given the lack of usable information, there are also likely to be a number of missed opportunities 176.

As referenced, one technical problem with the prior art systems of FIGS. 3 and 4 is the IOI sending user's lack of relevant information as to the trading posture of potential counterparties. Another technical problem is that users are forced to choose between (i) broadly casting indications of interest to potential counterparties, which may result in information leakage and thereby further result in adverse changes in the market prices of the subject financial instruments, or (ii) narrowly casting indications of interest, which may result is a number of missed opportunities to trade the financial instrument on favorable terms. In light of the foregoing, the present invention seeks to address these and other problems.

SUMMARY OF THE INVENTION

The present invention seeks to overcome and provide a technical solution to the technical problems in the current state of the art as described above.

In an embodiment of the present invention, a system for routing an indication of interest message, comprising:

(i) a first computer element communicatively associated with one or more trade messaging systems, the first computer element programmed and configured to receive trade activity information from the one or more trade messaging systems relating to a history of trading activity of a plurality of trading counterparties;

(ii) a database for storing the information relating to a history of a trading activity of the plurality of trading counterparties; and (iii) a second computer element communicatively associated with the database and with at least one user computer, the second computer element programmed and configured to receive an indication of interest message from the at least one user computer and route communication of the indication of interest message to at least one of the plurality of trading counterparties based at least in part on the information relating to a history of trading activity of the plurality of trading counterparties stored in the database.

In another embodiment of the present invention, a method for routing an indication of interest message, comprising:

(i) receiving the indication of interest message, the indication of interest message including at least information related to a financial instrument and a buy or sell indication;

(ii) comparing the information in the indication of interest message with information related to a trading posture of a plurality of trading counterparties; and (iii) routing the indication of interest message only to those trading counterparties whose information related to the trading posture indicates a probability of consummation of the buy or sell indicated in the indication of interest message.

In a further embodiment, a computer implemented method for routing an indication of interest message, comprising:

monitoring at least one external trade messaging system to receive information regarding a trading posture of a plurality of trading counterparties;

storing the information in a database;

accessing the database upon receipt of an indication of interest message to compare the information related to the trading posture of the plurality of trading counterparties with information in the indication of interest message related to the financial instrument and the buy or sell indication; and transmitting the indication of interest message to those trading counterparties whose information related to the trading posture indicates a probability of consummation of the buy or sell indicated in the indication of interest message.

The foregoing summary is meant to be illustrative of the various embodiments of the invention and is not meant to limit in any way either the inclusion of other embodiments disclosed in the detailed description of embodiments or of the various alternatives disclosed therein. Various objects, features, aspects and advantages of the embodiments of the present invention will become more apparent from the following detailed description of preferred embodiments of the invention, along with the accompanying figures in which like numerals represent like components.

BRIEF DESCRIPTION OF THE FIGURES

FIG. 10 is a sample IOI message in accordance with an embodiment of the present invention;

DETAILED DESCRIPTION OF THE EMBODIMENTS

Figure 1:
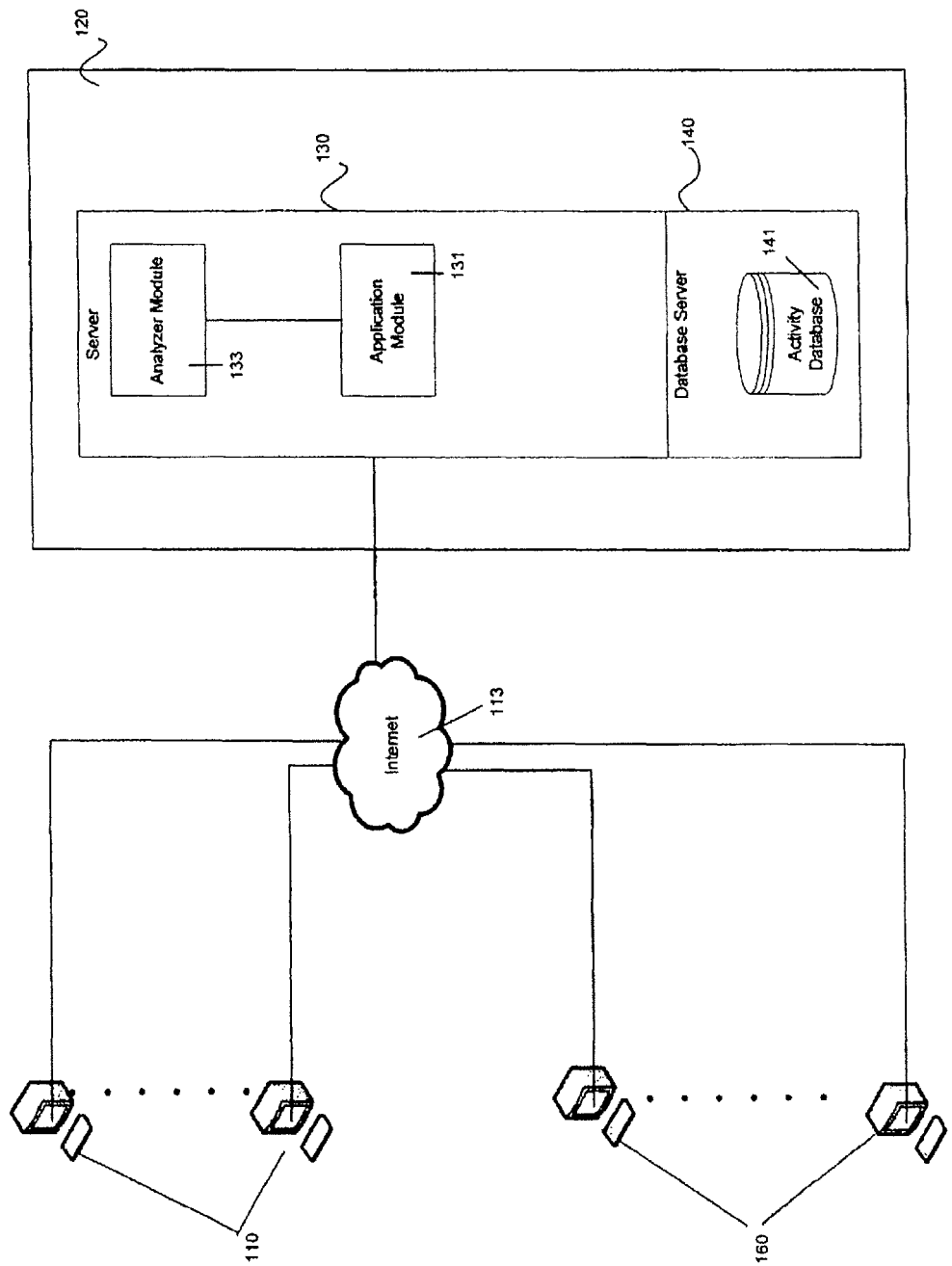
FIG. 1 is an overview of a system architecture in accordance with an embodiment of the present invention.

One aspect of the present invention provides a computer system, operative with programming and related databases, and configured to receive, analyze and/or transmit trade orders and execution activity over one or more messaging systems. An embodiment of the present invention includes, for example, a system for determining which side of a transaction involving a financial instrument an entity is likely to be on (e.g., buyer-side or seller-side). Another aspect of an embodiment of the present invention includes, for example, a system for improving effectiveness of IOI targeting through directing IOI messages, across messaging systems, to parties that are likely to be on the opposite side of the transaction, thereby reducing same side "information leakage." Certain embodiments of the present inventions use "intelligent" logic to identify entities that have a high probability of possessing a complementary posture (e.g., being on the opposite side of a hypothetical transaction) with respect to the financial instrument at issue.

As used herein, the term "messaging systems" refers to systems, like TRN, AutEx or any other such messaging system, in which one or more systems (as further described below) receive electronic messages, analyze such messages, and use programmed logic to cause such messages to be electronically routed to appropriate external computer systems. It will be understood by persons of ordinary skill in the art that the electronic messages can be formatted using a variety of known or hereafter developed message formats, including but not limited to XML and SGML, and/or financial message formats, such as SWIFT and FIX. As used herein, the term "financial instruments" generally refers to various types of securities, such as by way of non-limiting examples, equities, fixed income instruments, commodity futures, and derivatives of all types. Additionally, as used herein, the term "user" may refer to an individual, group, or entity. Furthermore, as used herein, the term "buy-side" and "sell-side" are not intended to be limited to any particular type of buyer or seller and can include, but are not limited to, dealer-to-dealer transactions and dealer to customer or institutional investor transactions. Further still, as used herein, the term "database" refers to one or more data files containing information that may be stored on one or more storage mediums and controlled by one or more database management systems.

In certain embodiments of the invention, a system can be communicatively connected and configured to monitor financial instrument trade activity over one or more internal and/or external order management and trade execution messaging systems. As such, the monitored trade activity may include, by way of non-limiting example, trade orders or executions of various types. Trade activity may occur between trading partners (i.e., counterparties) such as, by way of non-limiting example, institutional subscribers of a particular trading or order management system and broker dealer subscribers of the same trading or order management system or other similar entities. Through the monitoring of such systems, the system of the present invention may advantageously capture information such as, by way of non-limiting example, whether an entity has in the past, or is presently looking to buy or sell a particular financial instrument, the price and quantity of said instrument, whether the entity is a principal or agent for another entity, the past and present buying or selling activity of an entity, or other related information. This information may be captured from IOI messages, execution reports, orders, or any other information source that reveals information related to the potential or likely trading stance of a counterparty.

The information captured by the system then can be analyzed (as described with detail below with reference to FIGS. 7, 8, and 11) to determine whether a particular entity is on the opposite (i.e., contra) side, or the same side to a transaction that a user of the system is interested in consummating. For example, the system may maintain an activity database which can, preferably on a substantially real-time basis, maintain two lists of entities for each financial instrument being transacted on the network: a buyer list and a seller list. Thus, for example, when a user decides to issue an IOI to purchase a certain amount of a particular financial instrument, the activity database may be used by the system as a resource to determine which entities the user's IOI should be routed to. If the user manually selects entities to send the IOI to, the activity database may be further used by the system to block transactions which are more likely to result in same side "information leakage."

Certain embodiments of the present invention will now be discussed with reference to the aforementioned figures, wherein like referenced numerals will refer to like components. It should be noted that references in the specification to phrases such as "one embodiment" or "an embodiment" means that a particular feature, structure or characteristic described in connection with the embodiment is included in at least one embodiment of the invention. The phrases such as "in one embodiment" or "in certain embodiments" in various places in the specification are not necessarily, but can be, referring to the same embodiment. Use of the term "preferred" or "preferably" is intended to indicate a configuration, set-up, feature, process, or alternative that may be perceived by the inventor(s) hereof, as of the filing date, to constitute the best, or at least a better, alternative to other such configurations, set-ups, features, processes, or alternatives. In no way shall the use of the term "preferred" or "preferably" be deemed to limit the scope of the claims hereof to any particular configuration, set-up, feature, process, or alternative.

With reference to FIG. 1, there is shown and described an embodiment of a system 100 including computer systems, databases, and programming for providing functionality, as described herein, to one or more users. In the embodiment being described, messaging system 120, for example, includes one or more server and database systems in communication with one another. Messaging system 120 can include a server 130 and a database server 140 communicatively interconnected via an internal network, such as a local area network or LAN (not shown). Server 130 preferably includes programming, including various modules for receiving and retrieving information and generally providing interaction with a user, including but not necessarily limited to, an application software module 131 and a data analyzer module 133. Messaging system 120 can also be connected to an external network 113, such as the Internet, which enables messaging system 120 to communicate with one or more user computers 110, 160. Database server 140 preferably includes at least one system database 141. User computers 110 may gain access to the messaging system 120 via network 113.

It should be noted that although the embodiments described herein describe the use of one server and one related database for performing the various functions of messaging system 120, other embodiments could be implemented by storing the software or programming that operates the described functions on any combination of multiple servers and databases as a matter of design choice so long as the functionality described herein is performed. Although not depicted in the figures, server 130 includes such art recognized components as are ordinarily found in server systems, including but not limited to processors, RAM, ROM, clocks, hardware drivers, associated storage, and the like. One skilled in the art will recognize, however, that because multiple users may be accessing such server at any given time it may become preferable to utilize multiple servers and databases, which may be used separately or in tandem to support the systems' traffic and processing, such as, by way of non-limiting example, a round-robin configuration utilizing multiple server systems. User 110, 160 computers can be personal computers including at least a network adapter and web browsing capability, but may also include handheld devices such as PDAs, mobile smart phones (e.g., Blackberry®, iPhone®, Treo®, and the like), or other wireless devices. Furthermore, in certain embodiments, user computers can be network systems having components such as servers, databases, etc. It should be noted that as used herein a user computer could be either user 110 computer or user 160 computer. The designation of a user computer as 110 or 160 depends on the user computer's function in a particular transaction with the IOI issuing user computer being user computer 110 and user computers possibly targeted by the IOI being user computers 160. It should be further noted that in certain embodiments when information is directed to users 110 or 160, the terms users 110 or 160 may refer to aspects of separate system which may be accessed by user 110 or 160 computers (e.g. an email account stored on an external system which a user 110 or 160 accesses).

It should be noted that although the embodiments described herein refer to multiple software modules for performing the various functions of system 100, other embodiments could be implemented using any number of modules, with any single module incorporating the functions of several, or all, of the modules. The precise design of the software and the programming language used may be designed differently within the scope of the present invention. The software modules can be created using art recognized programming languages, including but not limited to ASP, Java, C#, ASP.NET, or PHP or any combination of known programming languages that allow the functionality described.

It will also be understood that, although the various embodiments of the present invention described herein are being described in terms of web-based centralized server architecture, a thin client, fat-client, or peer-to-peer type arrangement could be substituted for the system architecture described herein and are within the scope of the present invention. Additionally, the programming described herein can be stored in a machine readable form on a computer readable medium, such as a CD-ROM or DVD, and distributed to users for installation on user computers 110. Alternatively, such programming can be downloaded via network 113. In either embodiment, communication with system 120 may be effected across network 113.

With reference again to FIG. 1, the functionality of the various programming modules of messaging system 120 will now be described. Application software module 131 causes, by way of non-limiting example, generation of a plurality of graphic user interfaces ("GUIs") (such as webpages), as shown for example in FIG. 9. By way of non-limiting example, information, received by messaging system 120 or generated by the data analyzer module 133, is processed to determine an appropriate response, as further described below. Based on such processing, application software module 131 retrieves data stored in system database 141 or stored on the messaging system 120, and generates a GUI by incorporating the retrieved response information in a template interface. The GUI is caused to be displayed by the application software module 131 by transmitting the GUI data across network 113 to the user computers 110 and/or 160.

In an embodiment, data analyzer module 133 is principally responsible for updating activity database 141 with information regarding financial instrument trade activity retrieved from the one or more various messaging systems 120 being monitored. Data analyzer module 133 can be further responsible for analyzing the trade activity in the financial instruments (as described in further detail below with reference to FIGS. 8, 9, and 11) to provide a substantially real-time analysis of various users 110, 160 involved in trading various financial instruments, and further determining which users are likely to be buyers 110, and which are likely to be sellers 160. In other words, for the purpose of understanding the figures, depending on a particular user's trading/order activity, that user's computer can be simultaneously a user computer 110 on one transaction and a user computer 160 on another transaction. This substantially real-time-analyzed information is also preferably stored in database 141.

Furthermore, data analyzer module 133 is preferably responsible for routing a user's IOI message 210 (received via application module 131) to receiving users 160 (if any) which are interested in being on the opposite side of the transaction proposed in the IOI sent by user 110. It should be noted that the routing may be automated or manual (e.g., specific targets can be manually requested by the user, in addition to, or as part of, the routing contemplated by the embodiments described herein). If, via the GUI generated by application module 131, the user specifically requests that the IOI be directed to users that have not been determined by data analyzer module 133 as being more likely to be complimentary, data analyzer module 133 can be configured to block the request. Put differently, if the entity 160 to whom the user 110 directs the IOI has been determined as being likely to be on the same side of the transaction, then data analyzer module 133 can block the transmission of the IOI. In an embodiment, data analyzer module 133 may be configured to permit a user to customize the blocking operation or to override the blocking operation as to specific targets on a "one-off" basis or as a general rule.

Figure 2:
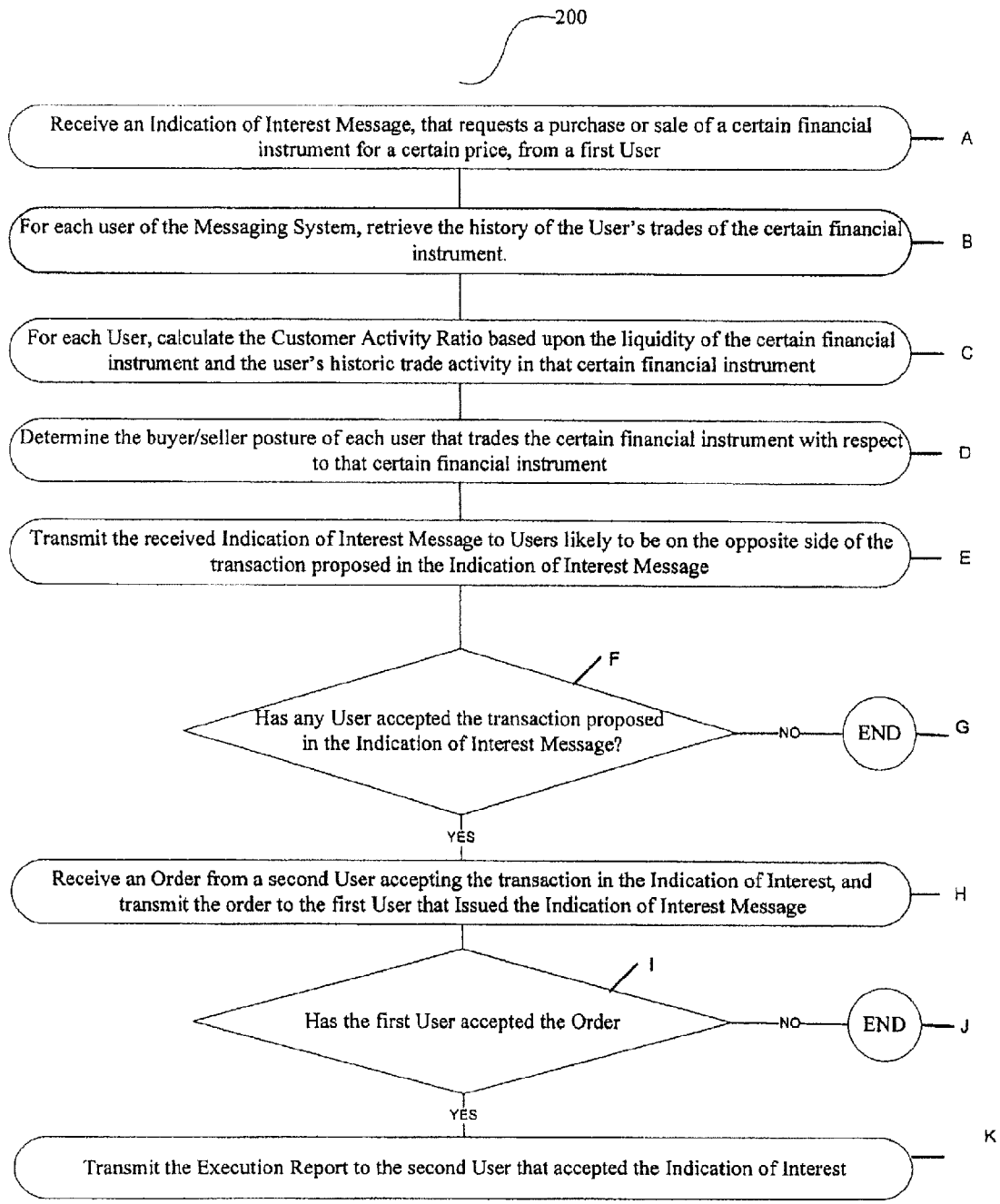
FIG. 2 is a flow chart of a process of routing indication of interest messages.
Figure 3:
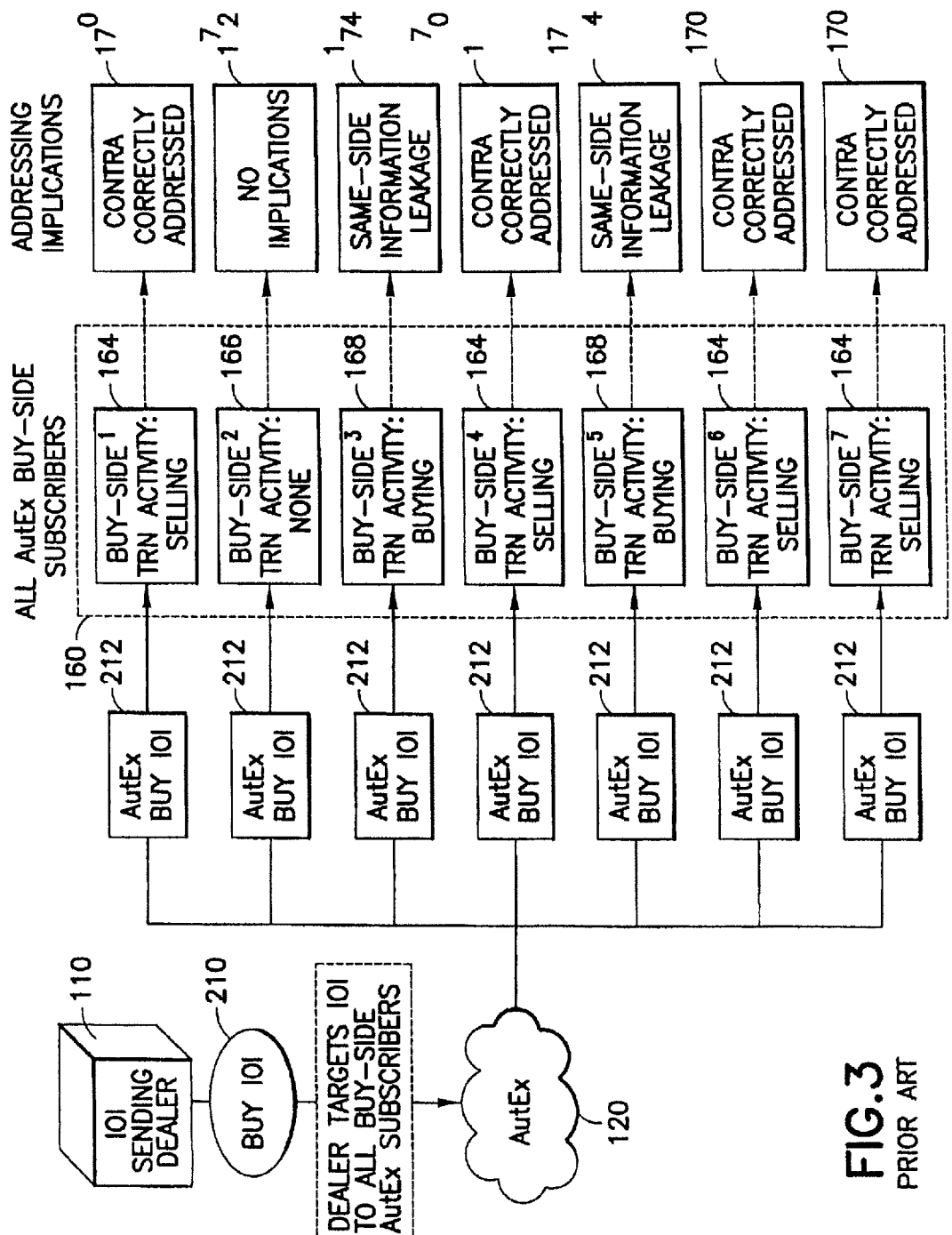
FIG. 3 is an example of a broadly cast IOI in prior art systems.
Figure 4:
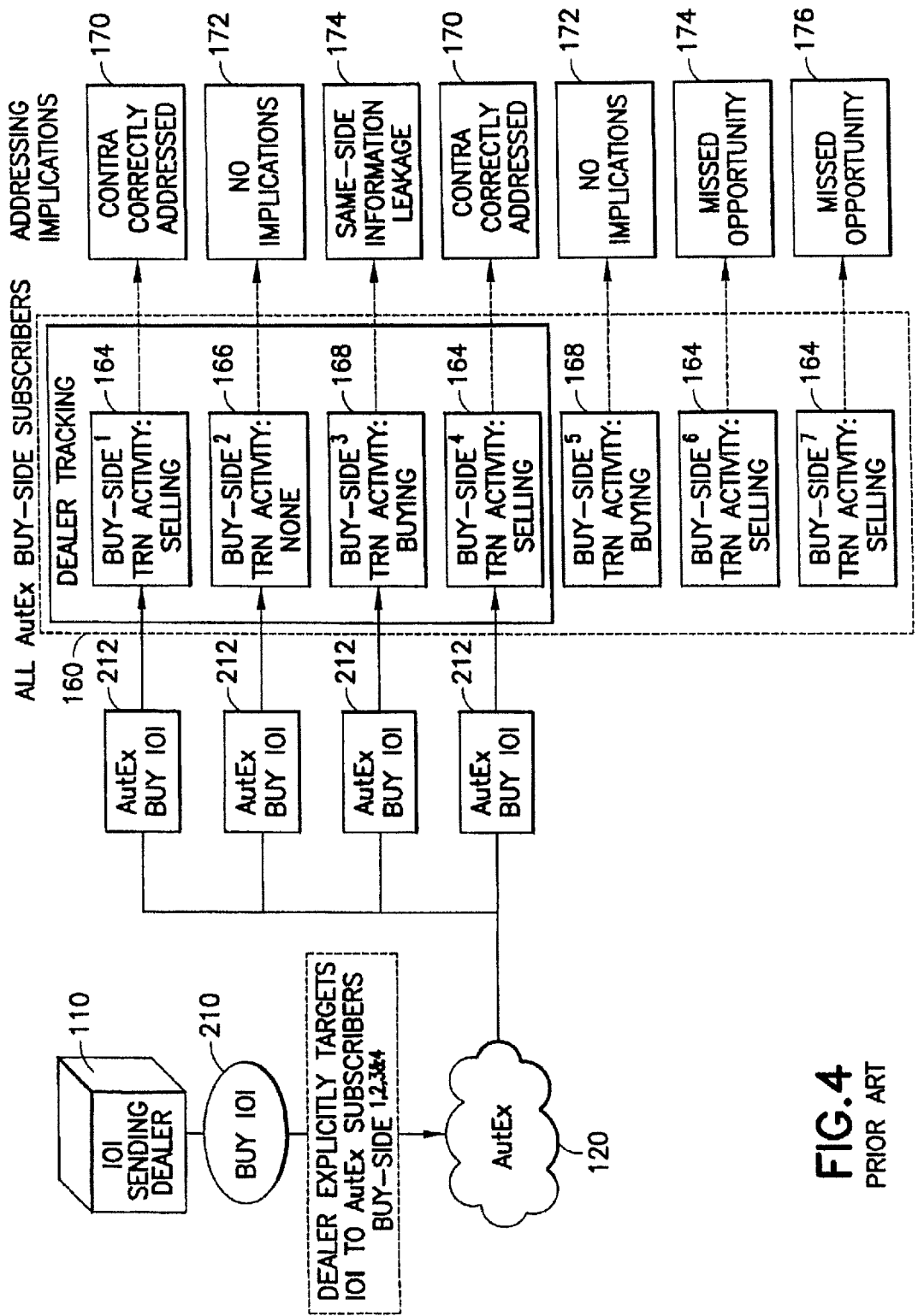
FIG. 4 is an example of a narrowly cast IOI in prior art systems.

With reference to FIG. 2, there will be described an embodiment of a flow of a typical trade of a financial instrument 200 that may occur in the disclosed systems. In step A, the messaging system 120 receives an IOI Message which can, in some embodiments, reference the disclosed system, that requests a purchase or sale of a certain financial instrument for a certain price, from a first User 110. Thereafter, in step B, for each user 160 of the messaging system 120, the data analyzer module 133 preferably retrieves the historical trading activity, as well as same-day trade executions and qualified orders (see disclosure below), of the user 160 with respect to the subject financial instrument from activity database 141. Afterwards, in step C, for each user 160, the data analyzer module 133 of the messaging system 120 calculate the customer activity ratio based upon the liquidity of the subject financial instrument and the user's historical and same day trade activity in that certain financial instrument (as described in detail below with reference to FIGS. 7 and 8). Next, in step D, data analyzer module 133 can determine, from available information, the trading posture, if any, with respect to the subject financial instrument for each user 160 that has traded or issued an order for the subject financial instrument. Next, in step E, the application module 131 of the messaging system 120 can transmit the received IOI Message to users 160 likely to be on the opposite side of the transaction proposed in the IOI Message. If, in step F, no user 160 accepts the transaction then, in step G, the process ends. If, however, a user 160 desires to execute a trade based on the IOI, the user 160 can submit an order via an external trade execution platform or, alternatively, transmit an order on a trade execution platform integrated with the messaging system 120. In the latter case, in step H, the application module 131 of the messaging system 120 receives an order from the user 160 that accepted the transaction, and transmits the order to the IOI originating user 110. Thereafter, in step I, the first user accepts or rejects the order, if the order is reject then in step J, the process ends. On the other hand, if the user accepts the order via the application module 131 of messaging system 120, then in step K the application module 131 of the messaging system 120 issues an execution report confirming acceptance of the order from user 110 and transmits it to user 160.

It should be noted that in certain embodiments steps C and D can be performed separately for all users and all financial instruments, and the results can be stored in activity database 141. This can be performed at preset intervals or on command. In those embodiments steps C and D, of the flow of a typical trade of a financial instrument 200, may be replaced by a step comprising accessing the activity database 141 to retrieve the buyer/seller posture of each user that trades the certain financial instrument with respect to that certain financial instrument (not shown).

It should be further noted that in certain embodiments of the invention, in addition to routing IOI message, order, and the execution report, the messaging system 120, via data analyzer module 133, can store the information contained in IOI message 210 and execution report 220, in the activity database 141. As described in further detail below, in some embodiments, data analyzer module 133 can further analyze the information related to the order to determine the position of the initiating user 110 and target user 160. Since in the described transaction the initiating user 110 was purchasing the financial instrument, the initiating user 110 is more likely to be on the buyer-side in the future, and likewise, since the target user 160 was selling the financial instrument, they are more likely to be on the seller side in the future.

It should additionally be noted that in certain embodiments orders and execution reports may be issued on an external, separate messaging systems, that may or may not share all or some of activity database 141. For example, in certain embodiments IOI messages will be placed and routed through messaging system 120, but orders and execution reports may be thereafter placed through an external system, with the records orders and execution reports being stored on the external system's own database. In those embodiments data analyzer module 133 would then access the database of that external system in order to calculate activity which would be stored in activity database 141. Alternatively, database 141 may be shared between the external system and messaging system 120 with both systems using it simultaneously. It should be further noted that the external system may obtain orders and execution reports in any way. For example, after receiving the order, users 110 and 160 may have a phone conference to agree on the details of the trade after which the order may be executed and an execution report issued. In some embodiments, it is possible that orders and execution reports are derived by messaging system 120 from a record of completed transactions.

Figure 5:
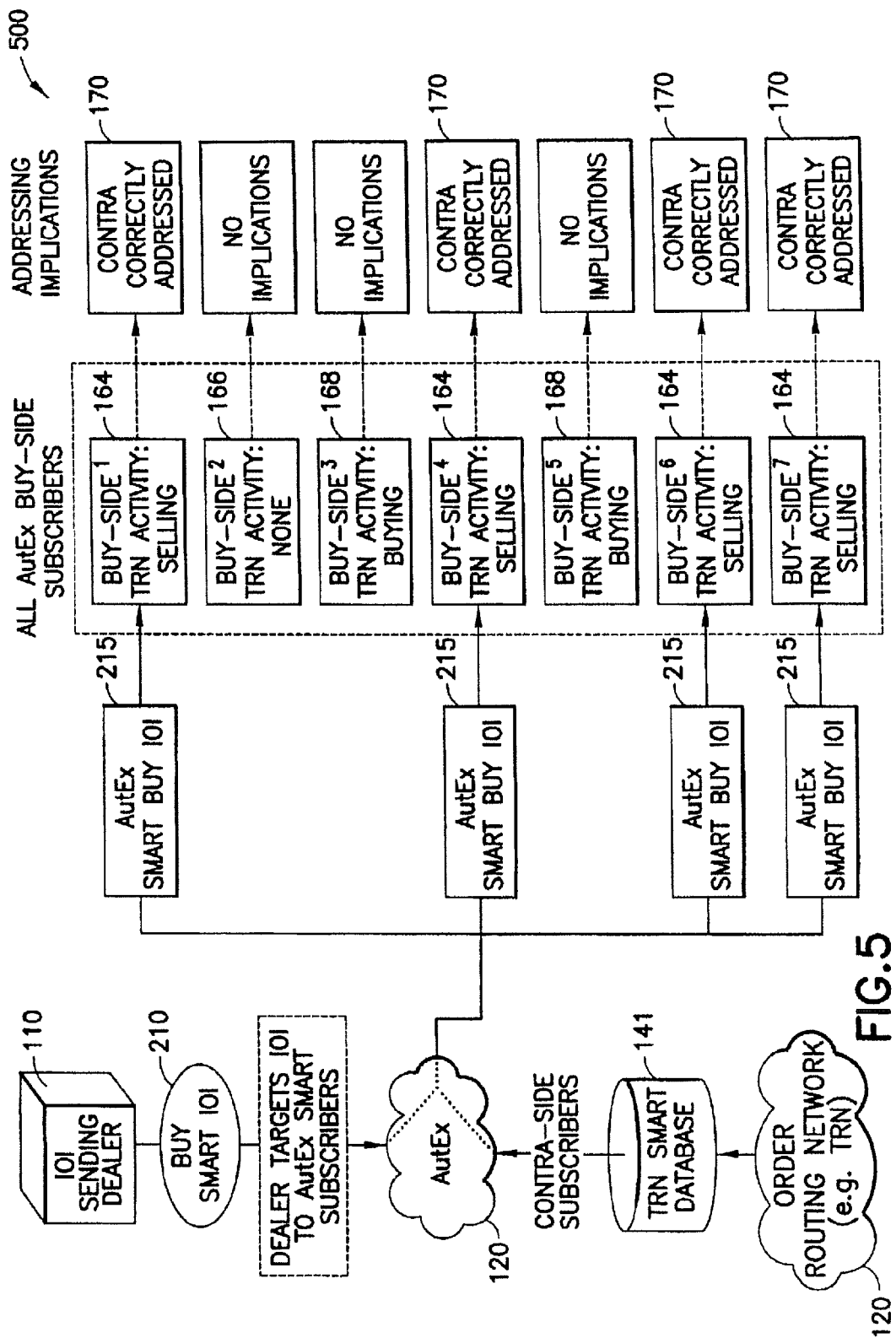
FIG. 5 is an example of an IOI cast in accordance with an embodiment of the present invention.

With reference to FIG. 5, there is shown an exemplary process 500 of a purchasing user 110 casting an IOI message 210 that is automatically directed towards users 160. The messaging system 120, via application module 131, accesses the activity database 141 and retrieves information used by data analyzer module 133 to determine real-time estimated positions of various users that are trading in the financial instrument subject to the IOI message 210. Thereafter, the messaging system 120, via application module 131, automatically directs the IOI message 210 exclusively towards the users 160 that have been determined as likely to be on the opposite side of the transaction proposed in the IOI message 210. As shown, the automatically directed IOI 215 is received by users interested in selling the financial instrument 164 and, thus, it is more likely that no missed opportunities 176 or information leakage 174 occurs. It should be noted that one or more messaging systems 120 may be used. It should be further noted that the determination of real time estimated position of users may be determined by data analyzer module 133 and stored in the activity database 141, or calculated in real time by the data analyzer module 133.

Figure 6:
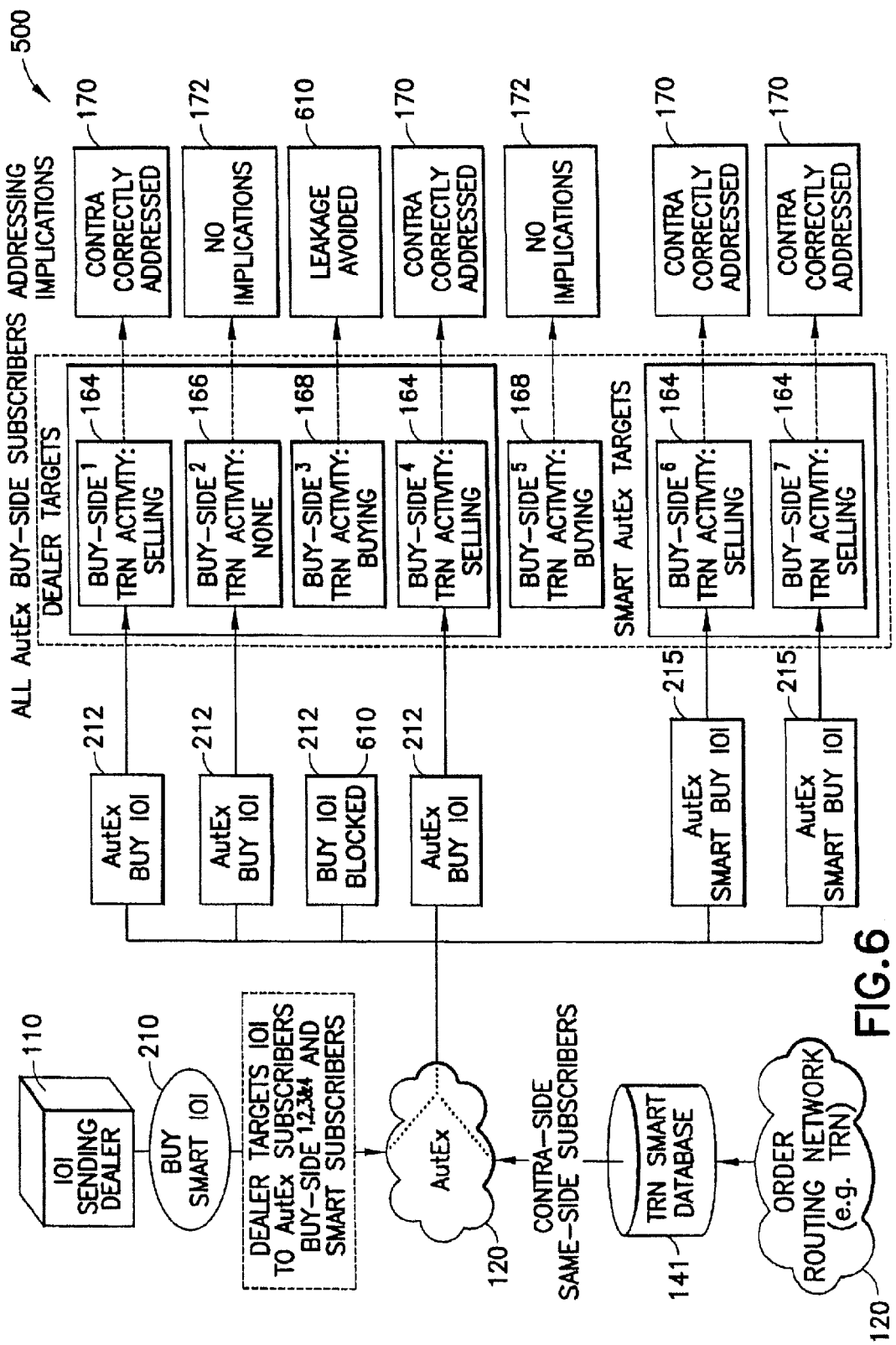
FIG. 6 is another example of an IOI cast in accordance with an embodiment of the present invention.

With reference to FIG. 6, there is shown another example of process 500. In the present example, a purchasing user 110 casts an IOI message 210 that is automatically directed towards users 160, and also specifically directed towards those users 160 that are separately selected by purchasing user 110. In this embodiment, in addition to the users selected as described above with reference to FIG. 5, the specifically directed IOI message 212 are directed to additional users 160, regardless whether data analyzer module 133 of messaging system 112 has determined those users 160 to be on the opposite side of the transaction proposed in IOI message 212. A user's, such as a dealer's, targeting methodology may be flawed, because it is often unrelated to the target user's trading activity (or based, as described earlier, on a subset of the target's trading activity). In these instances, application module 131 of messaging system 120 may be configured to refuse to transmit requests that will go to users 160 that have been determined to be on the same side of the transaction 168, but to permit specifically directed IOI message 212 to reach those users 160 that are likely to be disinterested in the proposed transaction 166. A further possibility (not shown), may occur in situations where the IOI message is directed to users that have substantial purchasing and selling activity. In these instances, the system may be configured to transmit the IOI to users qualifying as both buyer and sellers based on significant activity on both sides, or alternatively block these users. What action the system takes may further depend on whether the IOI was specifically directed to particular targets or broadly cast to a number of targets.

Figure 7:
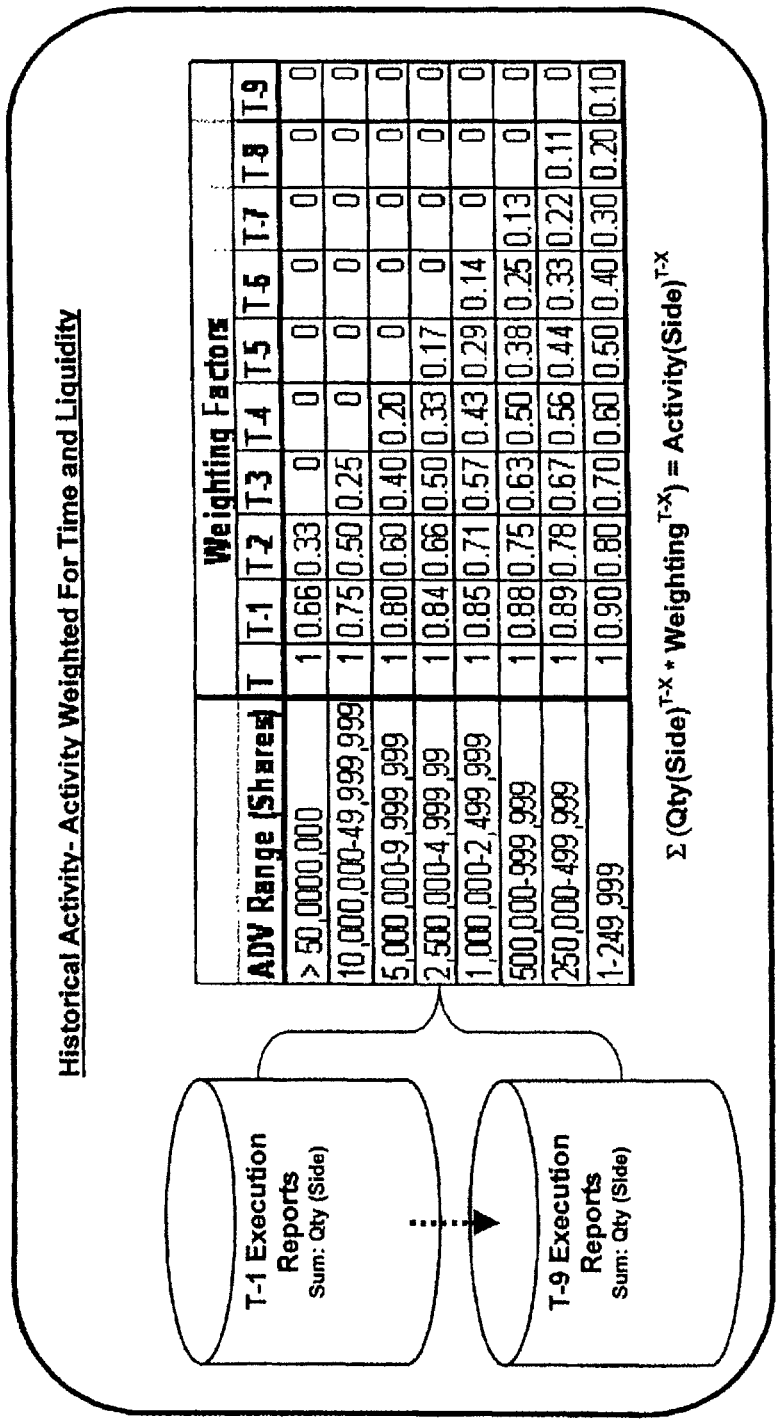
FIG. 7 is an example of a historical age adjusted baseline activity weighing factor chart used in calculating the activity weighted for time and liquidity.

With reference to FIG. 7, there is shown an example of calculation of a baseline trading activity for a user 160. This calculation is preferably performed by data analyzer module 133, and the results can be stored in activity database 141. The baseline trading activity preferably will be calculated separately for each of the selling activity and buying activity of a user 160. By way of non limiting example, a baseline trading activity for a customer may be based on the customer's aggregated trading activity for the current trade date (T) and historical activity going backwards for a period of time, preferably 9 days. In this example, historical activity for the previous 9 days (T-1 to T-9) for each financial instrument will preferably consist of actual shares purchased or sold. Historical activity is preferably derived from execution reports sent over the messaging network 120, but any other available source of relevant information may be used.

To obtain the baseline activity, the activity of a customer is preferably weighted based on the age of the historical activity relative to the present trade date, with the recent activity being given heavier weight than older activity (e.g., Weighting Factor$^{T-1}$>Weighting Factor$^{T-2}$>Weighting Factor$^{T-3}$>Weighting Factor$^{T-4}$, etc.), as well as the size of the trading volume in the particular financial instrument. The precise weighting coefficients may be calculated based upon the historical rate of decay for a given financial instrument, which can be derived from the average daily volume (ADV) figure. The weightings for more liquid securities (higher ADV) preferably decay, from 1 on day one (T), to a factor of 0.00 in a shorter time frame than for less liquid securities (lower ADV). Thus, the more liquid a financial instrument, the less weight is given to historic activity. For example, as shown in FIG. 7, the weighting factor for a financial instrument with an ADV greater than 50,000,000 will reach 0 in three days (0.66 on T-1, and 0.33 on T-2, and 0.0 on T-3), whereas weighting factor for a financial instrument with an ADV between 1 and 249,999 will still have a weighting factor of 0.1 on T-9. The weighing factors preferably decrease in a straight line decay pattern, though a non-linear decay can be also used. The baseline activity figure for each customer and financial instrument can be calculated by combining weighted activity for the previous 9 days as well as activity derived from orders and execution reports for the current day. This baseline activity figure calculation may be performed at preset intervals e.g., once a day (though any other interval may be used), or on command.

Figure 8:
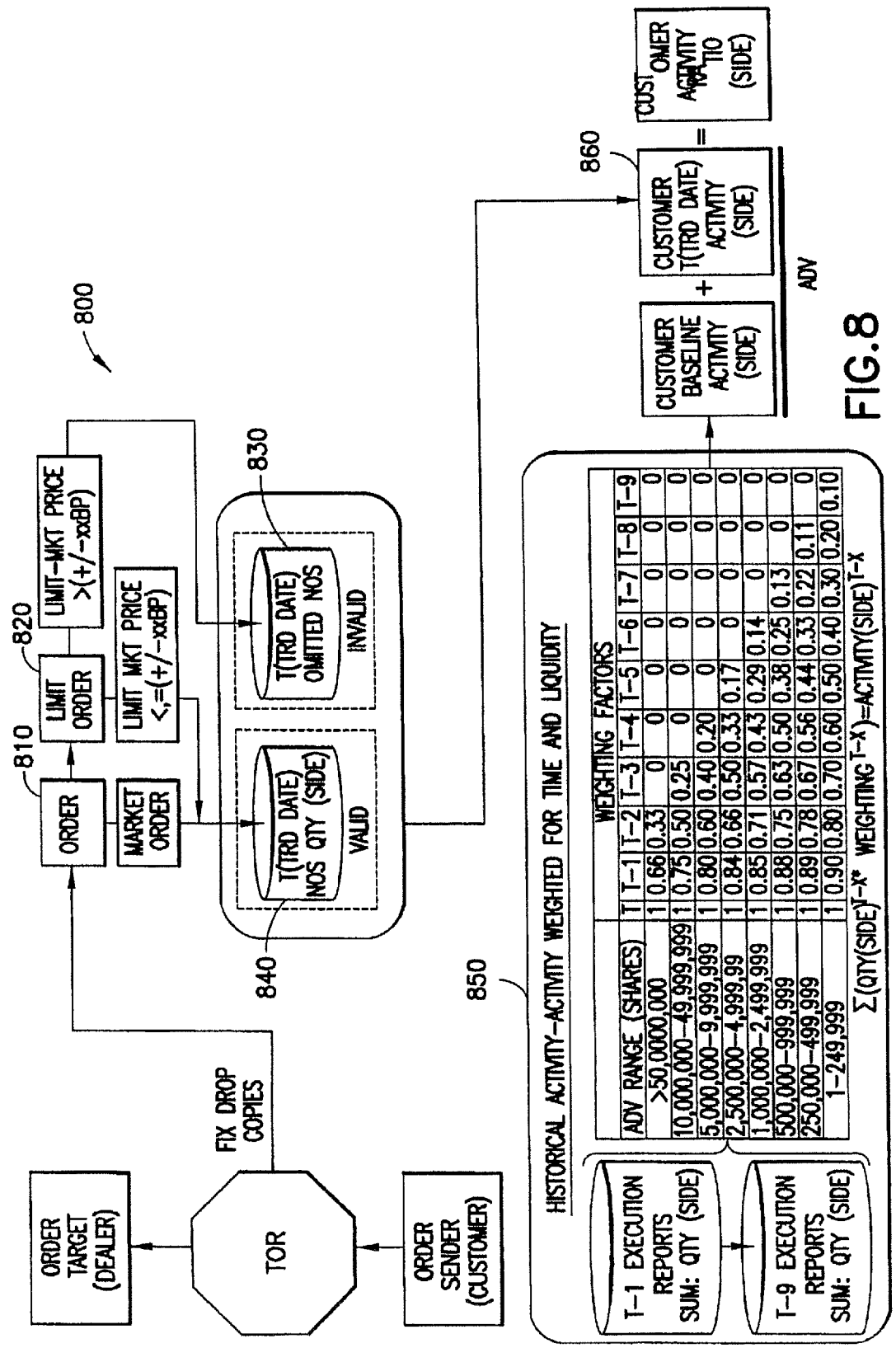
FIG. 8 is a flow chart of the process used by the system to determine the position of a purchaser or seller entity.
Figure 11A:
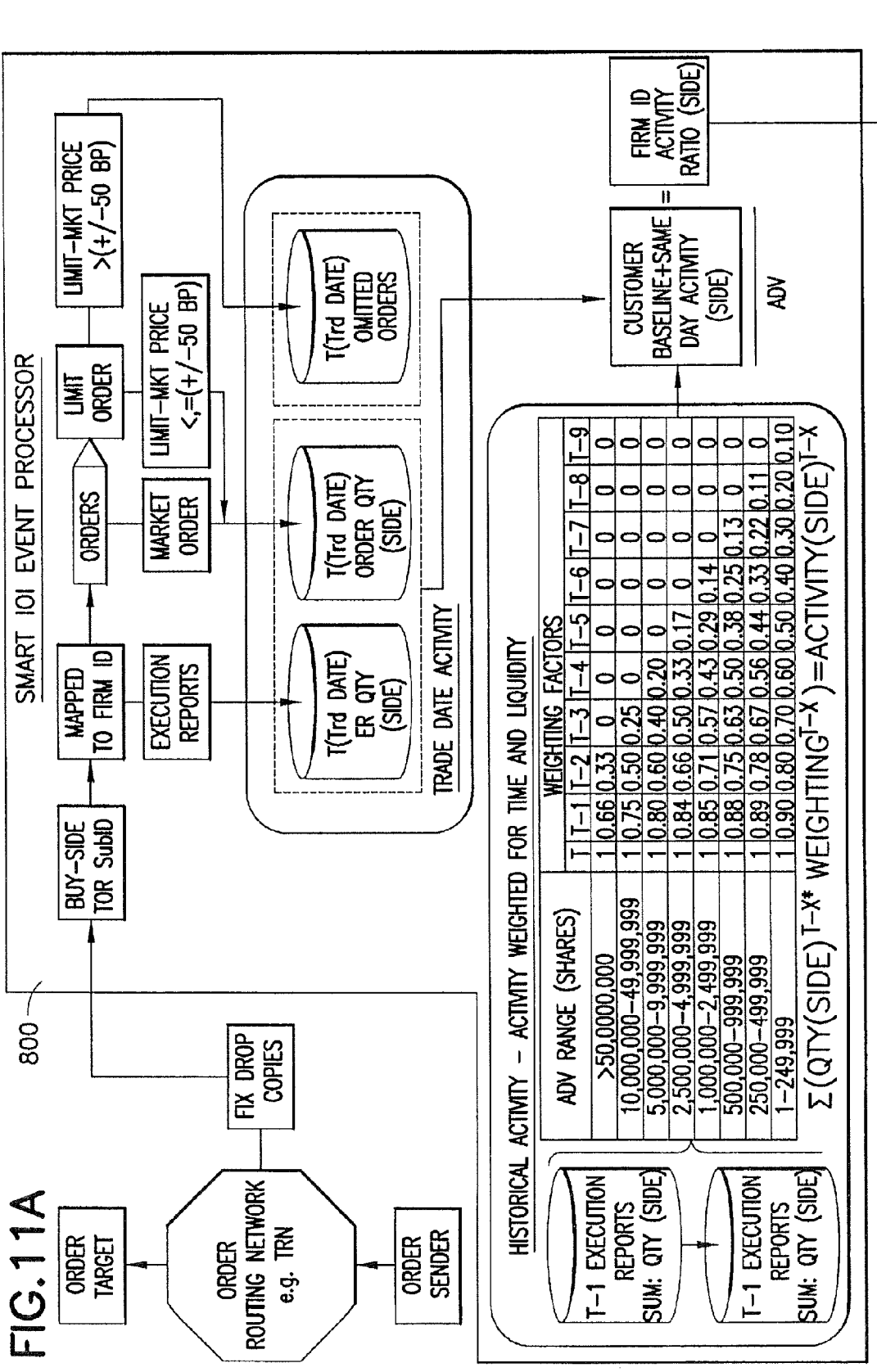
FIG. 11 is a high level diagram of the flow of IOI routing in accordance with an embodiment of the present invention.

With reference to FIG. 8, there is shown an exemplary logic flow process 800 followed by the messaging system 120 in order to calculate the customer activity ratio (used to establish the position) of each user 160 for a specific financial instrument. In step 850, (as described above with reference to FIG. 7) the data analyzer module 133 of the messaging system 120 can calculate the baseline activity by aggregating weighted historical data. For trades that have not yet been completed (i.e. no execution report has been issued), in step 810, the messaging system 120 can consider orders and determine whether each order is a "Market Order" [no limit price parameter] or "Limit Order" [defined limit price parameter]). If the order is a Market Order then, in step 840, the market order is preferably considered valid and added to customer baseline activity derived in step 850 (additionally, as shown in FIG. 11, the market orders may also be added as activity on day T in step 850). Alternatively, if the order is a limit order, then in order to avoid potential "gaming" of the messaging system 120, in step 820 consideration of Limit Order share quantities can be limited to situations where the "Limit Price" is not GREATER THAN a certain amount basis points, preferably 50, away from the inside market for the financial instrument. Thus, a Buy Order price must be not be more than a certain amount of basis points below the prevailing Bid price and, conversely, a Sell order must not be a certain amount basis points above the prevailing Offer price. In this way, in step 830 a customer sending an order through the network with a non-relevant limit price can considered invalid, alternatively in step 840 it will be considered valid and added to the customer baseline activity derived in step 850. It should be noted that steps 840 and 850 can be performed in any order, and step 840 may be repeated several times (e.g. as new orders come in, at preset intervals). It should be noted, that the system is preferably configured such that market orders do not get double counted once they are accepted and an execution report is issued. This feature may be included by configuring the system to match the order identification numbers to the order identification numbers in the execution reports.

In step 860, the final activity ratio for a given user is preferably determined by obtaining a sum of the baseline activity derived in step 850 and current activity derived in step 840, and finally calculating the position as a ratio the sum and ADV. If the ratio is a substantial size for a selling activity then the user will be determined to be a seller. Alternatively, if the ratio is a substantial size for a purchasing activity, then the user will be determined to be a buyer. The ratio is preferably considered substantial if it is greater than 0.001, In certain embodiments, the messaging system 120 may be configured with an algorithm to permit a user 110 to select the sensitivity of their IOI messages, such that sensitive IOI messages (e.g. ones where information leakage is extra dangerous) are automatically routed to a select sub group of users 160 that are found to be likely to be on the opposite side of the proposed transaction. This subgroup may be, for example, in situations where the transaction proposed in the IOI is a purchase, those users 160 who have no purchase activity, or whose sell activity ratio is greater than 0.2, or any other algorithm that makes the likelihood of information leakage from sensitive IOI messages extra unlikely.

In use, a user 110 interested in purchasing 100,000 shares of stock X for $102/share can communicate this desire in an IOI message 210 to the messaging system 120 via a GUI generated by a application module 131 located on the server 130 of the messaging system 120. The data analyzer module 133 of the messaging system 120 would then access the activity database 141 via database server 140 and using a method, such as, for example, the one described above with reference to FIGS. 7, 8, 11 identify the users 160 that sell stock X. The data analyzer module 133 would send this information to the application module 131, which would automatically send directed IOI messages 215 to those seller users 160 thereby lowering the probability of missed opportunities and information leakage.

Figure 9A:
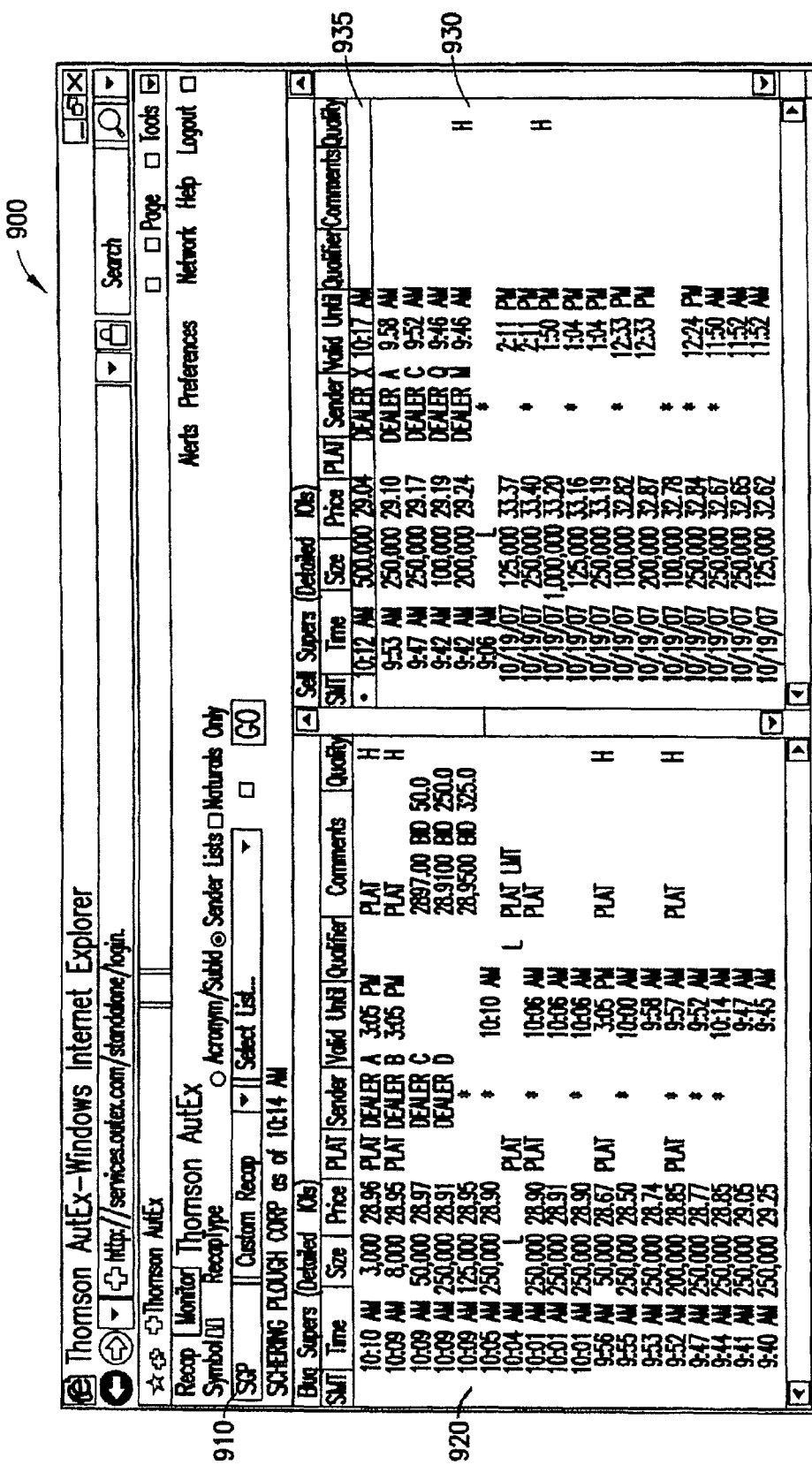
FIG. 9 is a screenshot of a graphic user interface ("GUI") in accordance with an embodiment of the present invention.

With reference to FIG. 9, there is shown an exemplary sample GUI 900 through which IOI messages can be delivered to targeted users. A user 110 may select a type of financial instrument of interest using the instrument selection interface 910 of GUI 900, thereby causing application module 131 to display several sections that show information in the form of IOI messages from other subscribers related to the selected financial instrument. A section of a GUI 900 can show a list of purchase IOI messages 920, another section may show a list of sales IOI messages 930, and a third section showing trade advertisements 940. In certain embodiments, IOI messages that were automatically directed (as opposed to specifically directed), may be visually accentuated through the use of buttons, icons, highlighting 935 or in any other visually emphasizing manner. It should be noted that any number of sections may be used, and any relevant information may be displayed in those sections. It should be further noted, that in certain embodiments, the users 160 to whom IOI messages were directed automatically may be hidden from the IOI issuing user 110.

FIG. 10 depicts an example of an IOI message 1000. As shown, an IOI may consist of a field describing the type of message 1030, the identification of the target of the IOI 1040, the number of the message in relation to the other messages 1050, the sender's computer identification 1060, the target's computer identification 1070, the time when the IOI was sent 1080, a unique IOI identifier 1090, the type of transaction being requested 1100, the IOI reference ID 1110, the symbol of the financial instrument being requested 1120, several fields used for security 1130-1150, the position of the IOI issuer (buyer or seller) 1160, the number of shares requested 1170, the price per share 1180, the currency 1190, and the status of IOI 1000. It should be noted that these fields are purely exemplary and more, fewer, and different types of fields may be used as a matter of design choice.

FIG. 11 depicts an example of a flow of the messaging system's 120 operation. As described above with reference to FIG. 8, in process 800, the system calculates activity ratios of users 160 on the system and stores them in the activity database 141. Then, as shown (in an alternate view) in FIGS. 5 and 6, in process 500, upon receipt of an IOI from user 110, the system 120 accesses activity database 141 and determines the proper course of action (which users 160 to direct the IOI to) and thereafter directs the IOI, blocks the JOT, or does nothing.

Figure 12:
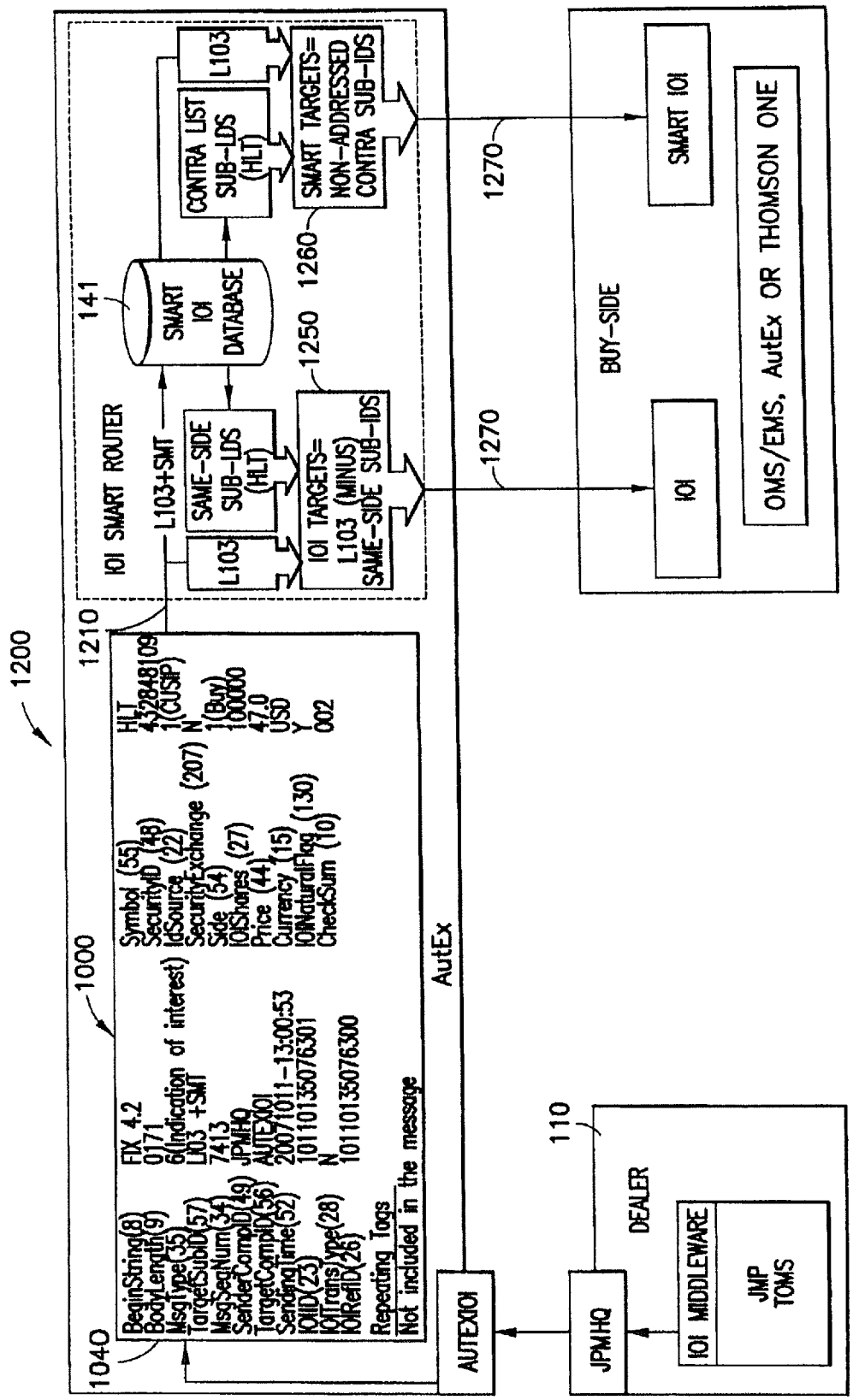
FIG. 12 is a sample processing of an IOI message in accordance with an embodiment of the present invention.

FIG. 12 depicts an example of a logic process 1200 that the system can cycle through when receiving a sample IOI message 1000 from a dealer. In this example, the dealer specifically targets certain users 160, as well as using messaging system 120 to automatically direct the IOI message to users 160 likely to be on the opposite side of the proposed transaction. As shown, identification of target field 1040 may contain identification a list of specific targets (e.g. L103, or any other identification that correlates to a target user 160), as well as an indication that automatic direction should be implemented (e.g. "+SMRT" or any other command that informs the messaging system 120 to perform automatic routing), and possibly a list of targets that should be ignored regardless whether they are found to be likely to be on the opposite side of the proposed transaction (e.g. by using a negative sign with the designation of targets). The messaging system 120, upon receiving the IOI, in step 1210, would access the activity database 141 and determine which users 160 have same-side positions to the user 110, and, in step 1220, which users 160 have opposite-side positions to the users 110. In step 1250 the system would take out the users 160 that were targeted but are also likely to be on the same side of the transaction, then, in step 1270, the system would issue IOI messages to the remaining targeted users 160. In step 1260, the system would take the list of users 160 that are likely to be on the opposite side of the proposed transaction, and, in step 1270, automatically direct an message to those that were not specifically targeted.

It will be appreciated by those skilled in the art, that the systems of the various embodiments of the invention may be configured in any way that is seen to be advantageous. By way of non-limiting example, the system may be configured to permit a user to send IOI messages to users that have been labeled as same-side users. Additionally, the system may be configured to establish the position of a user through information derived from external sources, for example if a particular user is known to be a seller, a the system may be configured to always label the user as such without giving weight to any historical analysis. Further, if there are extraneous sources of information regarding the position of a user, the system may be configured to use that information in addition or instead of performing an analysis based upon the historical trades performed on the system. Furthermore it should be appreciated that any number of days may be used for a historical analysis, any weighing factor, and any other information, and/or formula may be used in determining the buyer or seller position of a user.

It will be appreciated by those skilled in the art that the systems of the present invention may incorporate other software modules, such as an email and/or instant messaging modules for communication between users, or other software modules that may assist users with completing their trades. The need for these software modules may be determined by, for example, the types of financial instruments being traded.

It will be further appreciated by those skilled in the art that the figures are purely illustrative, and that the system may be implemented in any number of ways, by the actual designers, as long as the functionality, relating to the trading in financial instruments through a system that assists in identifying users that are likely to be on opposite sides of a transaction, stays intact.

The invention claimed is:

1. A computer implemented method for routing an indication of interest message for a financial instrument, comprising:
   (i) receiving at a processor the indication of interest message, the indication of interest message including at least information related to the financial instrument and a buy or sell indication;
   (ii) comparing on a processor the information in the indication of interest message with a buyer listing or a seller listing that is contra to the received buy or sell indication wherein the buyer listing and seller listing are each updated on a substantially real time basis based upon information related to a trading posture of a plurality of trading counterparties;
   (iii) utilizing a data analyzer module configured to update the information related to a trading posture of a plurality of trading counterparties based on an analysis of aggregated weighted historical data associated with at least one of the plurality of trading counterparties and the financial instrument to determine which counterparties of the plurality of trading counterparties are likely to be contra to the received buy or sell indication, and
   (iv) routing via a network the indication of interest message only to those trading counterparties where the information related to the trading posture indicates a trading posture that is contra to the received buy or sell indication based at least in part on the analysis performed by the data analyzer module, the first listing and the second listing and wherein the aggregated historical data comprises a weighting factor for each day of a predetermined number of days for which information relating to the history of trading activity is stored.

2. The method of claim 1, wherein the information related to the trading posture is derived from at least one historical activity by the trading counterparties.

3. The method of claim 2, wherein the at least one historical activity is weighted based upon age of the activity.

4. The method of claim 2, wherein the at least one historical activity is weighted based upon a liquidity of the financial instrument.

5. The method of claim 2 wherein the indication of interest message is specifically directed to at least one targeted counterparty, further comprising:
   blocking indication of interest message to the targeted counter party if there is a probability of non-consummation of the buy or sell.

6. The method of claim 2, wherein historical activity includes at least one currently existing unaccepted order.

7. The method of claim 2, wherein the at least one currently existing unaccepted order is less than 50 basis points from a market price of the financial instrument.

8. The method of claim 3, further comprising;
   weighting at least one historical activity after the receiving of the indication of interest message.

9. A computer implemented method for routing an indication of interest message for a financial instrument that comprises a buy or sell indication, the method comprising:
   monitoring at a processor at least one external trade messaging system to receive information relating to a trading posture of a plurality of trading counterparties;
   storing the information in a database;
   storing a seller listing for the financial instrument and a buyer listing for the financial instrument in the database which seller listing and buyer listing are updated on a substantially real time basis;
   updating the information in the database utilizing a data analyzer module configured to update the information related to a trading posture of the plurality of trading counterparties based on an analysis of aggregated weighted historical data associated with at least one of the plurality of trading counterparties and the financial instrument;
   accessing the database upon receipt of an indication of interest message to compare the stored information related to the trading posture of the plurality of trading counterparties with information in the indication of interest message related to the financial instrument to determine which counterparties of the plurality of trading counterparties are likely to be contra to the buy or sell indication indicated in the indication of interest message; and transmitting via a network the indication of interest message to those trading counterparties where the information related to the trading posture indicates a trading posture that is contra to the received buy or sell indication indicated in the indication of interest message based at least in part on the analysis performed by the data analyzer module, the seller listing and the buyer listing and wherein the aggregated historical data comprises a weighting factor for each day of a predetermined number of days for which information relating to the history of trading activity is stored.

* * * * *